| (12) | United States Patent<br>Königsson | (10) Patent No.:     US 9,272,241 B2<br>(45) Date of Patent:     Mar. 1, 2016 |
|---|---|---|

(54) COMBINED CLEANING SYSTEM AND METHOD FOR REDUCTION OF SOX AND NOX IN EXHAUST GASES FROM A COMBUSTION ENGINE

(71) Applicant: ALFA LAVAL CORPORATE AB, Lund (SE)

(72) Inventor: Staffan Königsson, Tumba (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/421,326

(22) PCT Filed: Sep. 10, 2013

(86) PCT No.: PCT/EP2013/068702
§ 371 (c)(1),
(2) Date: Feb. 12, 2015

(87) PCT Pub. No.: WO2014/048723
PCT Pub. Date: Apr. 3, 2014

(65) Prior Publication Data
US 2015/0231558 A1     Aug. 20, 2015

(30) Foreign Application Priority Data

Sep. 25, 2012    (EP) .................................... 12185840

(51) Int. Cl.
    *B01D 53/50*        (2006.01)
    *B01D 53/56*        (2006.01)
    (Continued)

(52) U.S. Cl.
    CPC .............. *B01D 53/56* (2013.01); *B01D 53/507* (2013.01); *B01D 53/78* (2013.01); *B01D 53/92* (2013.01);
    (Continued)

(58) Field of Classification Search
CPC .... B01D 53/50; B01D 53/501; B01D 53/504; B01D 53/56; B01D 53/74; B01D 53/75; B01D 53/77; B01D 53/78
See application file for complete search history.

(56) References Cited

U.S. PATENT DOCUMENTS 2,856,273 A     10/1958    Beber et al.
3,774,399 A *   11/1973    Nohira .................... F02D 21/08
                                                            123/568.11

(Continued)

FOREIGN PATENT DOCUMENTS

CN        101429891 A      5/2009
CN        101896247 A      11/2010

(Continued)

OTHER PUBLICATIONS

International Search Report (PCT/ISA/210) mailed on Dec. 20, 2013, by the European Patent Office as the International Searching Authority for International Application No. PCT/EP2013/068702.

(Continued)

*Primary Examiner* — Timothy Vanoy
(74) *Attorney, Agent, or Firm* — Buchanan Ingersoll & Rooney PC

(57) ABSTRACT

A combined cleaning system to be used in a wet scrubber process for reducing $SO_X$ and $NO_X$ in exhaust gases from a combustion engine comprises an Exhaust Gas Cleaning (EGC) scrubber and an Exhaust Gas Recirculation (EGR) scrubber. The combined cleaning system further comprises a scrubber water circulation tank arranged to circulate scrubber water in an EGC scrubber process loop between the scrubber water circulation tank and the EGC scrubber and in an EGR scrubber process loop between the scrubber water circulation tank and the EGR scrubber. The EGR scrubber process loop comprises an arrangement for supply of a first alkaline agent to the flow of scrubber water and a first separator unit to separate particulate matter from the circulated scrubber water.

17 Claims, 4 Drawing Sheets

(51) Int. Cl.
*B01D 53/74* (2006.01)
*B01D 53/75* (2006.01)
*B01D 53/77* (2006.01)
*B01D 53/78* (2006.01)
*F01N 3/08* (2006.01)
*F01N 3/04* (2006.01)
*B01D 53/92* (2006.01)

(52) U.S. Cl.
CPC *F01N 3/04* (2013.01); *F01N 3/085* (2013.01); *F01N 3/0842* (2013.01); *B01D 2251/604* (2013.01); *F01N 2570/04* (2013.01); *F01N 2570/14* (2013.01)

(56) References Cited

U.S. PATENT DOCUMENTS

| | | | |
|---|---|---|---|
| 3,957,418 A * | 5/1976 | Sata | B01D 53/34 422/168 |
| 6,511,529 B1 | 1/2003 | Pichler et al. | |
| 8,056,318 B2 | 11/2011 | Chillar et al. | |
| 2009/0107141 A1 | 4/2009 | Chillar et al. | |
| 2009/0120088 A1 | 5/2009 | Chillar et al. | |
| 2009/0151564 A1 | 6/2009 | Handagama et al. | |
| 2009/0155889 A1 | 6/2009 | Handagama et al. | |
| 2011/0107736 A1 | 5/2011 | Chillar et al. | |
| 2013/0037493 A1 * | 2/2013 | Konigsson | B01D 21/262 210/787 |
| 2013/0157833 A1 * | 6/2013 | Konigsson | B01D 53/96 494/5 |
| 2015/0238897 A1 * | 8/2015 | Molgaard | B01D 53/78 423/212 |

FOREIGN PATENT DOCUMENTS

| | | | |
|---|---|---|---|
| CN | 101896248 A | | 11/2010 |
| CN | 101970084 A | | 2/2011 |
| GB | 2473098 A | | 3/2011 |
| JP | 10-306719 A | | 11/1998 |
| JP | 2001-062467 A | | 3/2001 |
| JP | 2002-332919 A | | 11/2002 |
| JP | 2009-115086 A | | 5/2008 |
| JP | 2012-013089 A | | 1/2012 |
| JP | 2012 047056 A * | 3/2012 | ............. F02M 25/07 |
| WO | 2009/039445 A2 | | 3/2009 |

OTHER PUBLICATIONS

Written Opinion (PCT/ISA/237) mailed on Dec. 20, 2013, by the European Patent Office as the International Searching Authority for International Application No. PCT/EP2013/068702.

* cited by examiner

COMBINED CLEANING SYSTEM AND METHOD FOR REDUCTION OF SOX AND NOX IN EXHAUST GASES FROM A COMBUSTION ENGINE

TECHNICAL FIELD

The invention relates to a combined cleaning system to be used in a wet scrubber process for the reduction of $SO_X$ and $NO_X$ in exhaust gases from a combustion engine. The invention also relates to a method for the reduction of $SO_X$ and $NO_X$ in exhaust gases from a combustion engine by using a combined wet scrubber cleaning system. Further, the invention relates to use of the combined cleaning system on-board a ship for the purpose of reduction of $SO_X$ and $NO_X$ in exhaust gases from a combustion engine.

BACKGROUND

During the combustion of fossil fuels, sulphur in the fuel is released in form of sulphur oxides ($SO_X$). Other pollutants are primary particulate matter and nitrogen oxides ($NO_X$). It is well known that air pollution seriously impact peoples health and the environment. It is also well known that sulphur dioxide and nitrogen oxides are the major precursors of acid rain.

So far, legislation and setting environmental standards of emission control for international shipping has lagged behind the land-based emission regulations. Present regulations include caps on the sulphur content of fuel oil as a measure to control $SO_X$ emissions. Special fuel-quality provisions exist for $SO_X$ in emission control areas and there are substantial reductions in the allowed fuel sulphur limits to be expected in the near future. The MARPOL Annex VI legislation, which went into effect in May 2005 following specifications from several European Union directives, has curbed the impact of marine diesel on the environment. By 2015, the legislations will be even stricter regarding by way of example fuel sulphur limits and NOx cap.

There are different emission reduction possibilities, either taken alone or in combination. One possibility is to use new fuels such as distillate fuels or low sulphur fuels. Another possibility is to further develop methods to control the emission of $SO_X$ such as wet scrubber technologies using alkaline agents such as NaOH-solutions, or dry scrubber technologies using granulated limestone ($Ca(OH)_2$).

It is well known in the marine industry today for the purpose of reducing $SO_X$ and $NO_X$ gases in the exhaust from a ship to apply Exhaust Gas Cleaning (EGC) for $SO_X$ reduction and Exhaust Gas Recirculation (EGR) for $SO_X$ and $NO_X$ reduction. Both the EGC and EGR processes may apply a wet scrubber technology using an alkaline agent such as a NaOH-solution for removal of $SO_X$. However, since the EGC process is applied on the low pressure side of the exhaust source and the EGR process is applied on the high pressure side it is not possible for them to share the same wet scrubber.

Further, there are different requirements regarding the need for removal of particulate matter, such as soot, oil or heavy metals. The EGR process requires full flow cleaning of all liquid before introduced into the wet scrubber to thereby minimize the amount of particulate matter otherwise entering the engine, causing deposits therein. The EGC process on the other hand is not particularly sensitive to particulate matter in the scrubbing process, but soot precipitations on deck may occur if the amount of particulate matter in the water used in the scrubbing process becomes too high. Thus, it is recommended that each process is provided with a separator, such as a centrifugal separator.

When capturing $SO_X$ in both processes, the content of dissolved sulphite and sulphate increase, causing the density of the scrubber water to increase. There is a maximum amount of allowed dissolved salt in the water since precipitation of solid salt might occur. Also, the density of the water might become too high for the centrifugal separators to work optimal.

Accordingly, even though both EGC and EGR processes use a wet scrubber technology, they have partially different requirements, whereby they cannot easily be combined.

SUMMARY

An object of the invention is to provide a system allowing an EGC process to be combined with an EGR process in order to save space onboard a ship and also in order to allow a reduced required amount of freshwater.

This is achieved by means of a combined cleaning system to be used in a wet scrubber process for the reduction of $SO_X$ and $NO_X$ in exhaust gases from a combustion engine, the system comprising an Exhaust Gas Cleaning (EGC) scrubber and an Exhaust Gas Recirculation (EGR) scrubber, characterized in the combined cleaning system further comprising a scrubber water circulation tank arranged to circulate scrubber water in an EGC scrubber process loop between the scrubber water circulation tank and the EGC scrubber and in an EGR scrubber process loop between the scrubber water circulation tank and the EGR scrubber. The EGR scrubber process loop comprises an arrangement for supply of a first alkaline agent to the flow of scrubber water and a first separator unit for the purpose of separating particulate matter from the circulated scrubber water.

Thus, the combined cleaning system combines the EGC and the EGR scrubber processes with one and the same scrubber water circulation tank. This allows a substantially reduced required installation area, which is of high relevance when designing completely new installations onboard a ship, and of utter most importance in retro-fittings, i.e. when existing exhaust gas cleaning systems are upgraded onboard a ship where the available space is limited.

By the combined cleaning system the available water volume made possible to be used in the EGR process is greatly increased as compared to prior art systems where the EGC process and the EGR process are operated with separate scrubber water circulation tanks. Generally, the required water supply in an EGR process is substantially lower than in an EGC process since the amount of exhaust gas to be treated by the EGR process normally is substantially lower than that to be treated by the EGC process. As a typical, not binding example, about 40% of the exhaust gas is treated by the EGR process. By the inventive system, the EGR process may be operated at full capacity even though it might not be required in view of the present engine load without considering the required water volume. Thereby the advantageous effect is achieved that the level of particulate matter in the water circulated via the scrubber water circulation tank and thus also in the EGC process might be reduced. This allows minimizing soot precipitation on deck. This is advantageous during not at least a port stop where the engine is running, although at a lower load.

Yet another advantage by the combined cleaning system is that the two scrubbers included therein may share the same equipment for overboard treatment, such as equipment for separating particulate matter and equipment used for discharge waste scrubber water and particulate matter.

As specified above, the EGR scrubber process loop comprises an arrangement for supply of a first alkaline agent to the flow of scrubber water. This arrangement may be positioned between an outlet of the scrubber water circulation tank and an inlet of the EGR scrubber. By controlling the dosing, the alkalinity of the scrubber water supplied to the EGR scrubber may be optimized. Generally an EGR process operates at a higher pH as compared to an EGC process. It is to be understood that the arrangement for supply of the first alkaline agent may be used for the supply of the first alkaline agent to the EGC scrubber process loop as well.

As specified above, the EGR scrubber process loop comprises a first separator unit for separating particulate matter from the circulated scrubber water. This first separator unit may be arranged in a position between the outlet of the scrubber water circulation tank and the inlet of the EGR scrubber. Generally the level of particulate matter circulated into the EGR scrubber should be kept at a minimum since there is a risk that such particulate matter may be introduced together with the portion of the cleaned exhaust gas to be re-introduced into the combustion system of the engine, causing deposits and damages therein. Further, since the water cleaned by the first separator unit is also recirculated into the scrubber water circulation tank and further into the EGC scrubber process loop, the first separator unit arranged in the EGR scrubber process loop may contribute to an overall cleaning of the circulating scrubber water by also taking care of particulate matter from the EGC scrubber process loop.

The first separator unit may be a high speed separator, a partial discharge high speed separator or a total discharge high speed separator. These types of separator units are well known by the skilled person for use in EGC and EGR scrubber processes for separation of particulate material whereby no further explanation is given.

The combined cleaning system may further comprise a clean water buffer tank arranged in a position between an outlet of the first separator unit and the inlet of the EGR scrubber. A clean water buffer tank, possibly pressurized, may allow for a continuous water supply to the EGR scrubber process even when the first separator unit is shifted from a normal operation mode, being a separation mode, to a discharge mode for the purpose of discharging separated sludge in the form of water and particulate matter to a sludge tank.

The EGC scrubber process loop may comprise an arrangement for supply of a second alkaline agent to the flow of scrubber water in a position between the outlet of the scrubber water circulation tank and the inlet of the EGC scrubber. Generally an EGC process operates at a lower pH compared to an EGR process. By controlling the dosing, the alkalinity of the scrubber water supplied to the EGC scrubber may be optimized. It is to be understood that the arrangement for supply of the second alkaline agent may be used for the EGR scrubber process loop as well. Thus, the first and second alkaline agent supply arrangements may be one and the same arrangement wherein the first and second alkaline agents may be one and the same agent.

The combined cleaning system may further comprise a bleed-off process loop, the bleed-off process loop comprising a second separator unit and a sludge tank, and the bleed-off process loop being connected to the EGC scrubber process loop and/or to the EGR scrubber process loop.

The bleed-off process loop allows bleeding-off excess water that is inevitable introduced to the combined cleaning system by way of example water condensed from the hot exhaust gas treated in the EGC and the EGR process loops and by fresh water that may be supplied for the purpose of diluting the circulating scrubber water for keeping salt concentrations below saturation levels. Also, the bleed-off process loop allows a discharge of separated waste material in the form of sludge and particulate matter.

Generally an EGR process operates at a higher pH than an EGC process. By only allowing water to leave the scrubber system from the EGC process loop any excess alkaline agent supplied to the EGR process but not consumed therein will be circulated into the EGC process to instead be consumed therein. This allows for an overall reduced supply of alkaline agent.

The bleed-off process loop may further comprise an arrangement for the supply of a coagulant in a position after an outlet of the bleed-off tank and before an inlet of the second separator unit. A coagulant, typically in the form of a trivalent metal ion such as Aluminum or Iron, may be used to improve the performance of the second separator unit, by the coagulant forming chemical compounds where the particulate matter is connected to metal salts. Such chemical compounds are heavier and easier to separate by the second separator unit.

The combined cleaning system may further comprise a retention tank, the retention tank being arranged in a position between the arrangement for the supply of the coagulant and the inlet of the second separator unit. The retention tank allows the coagulant sufficient dwell time for precipitation/coagulation of particulate matter in the scrubber water before being fed to the second separator unit.

The combined cleaning system may further comprise a collecting tank, the collecting tank being arranged to collect water separated by the second separator unit, whereby the collecting tank is connected to the EGC scrubber process loop in a position between the outlet of the scrubber water circulation tank and the inlet of the EGC scrubber.

The water collected in the collecting tank may thus be used to clean or flush the EGC scrubber upon a change from sea water mode to fresh water mode to thereby reduce corrosion related problems and also to avoid that sea water is introduced into the EGR scrubber. More precisely, if having a combined system, the fresh water and the sea water must share a number of components such as inlet piping, pumps, scrubbers and outlet piping. Accordingly, if simply changing from sea water mode to fresh water mode, a lot of sea water will end up in the common tank and hence into the EGR system. This requires that parts potentially subjected to sea water should be designed in material not prone to corrosion. However, by cleaning/flushing the EGC scrubber with water, free of salt, it may be avoided to get chlorides into the scrubber water circulation tank and thus, the problems with corrosion mentioned above may be solved. The quality of the water separated by the second separator unit may undergo a quality control to ensure that the salt levels of the water to be collected in the collecting tank are within acceptable levels.

According to another aspect, a method is provided for the reduction of $SO_X$ and $NO_X$ in exhaust gases from a combustion engine by using a combined wet scrubber cleaning system which comprises an Exhaust Gas Cleaning (EGC) scrubber, an Exhaust Gas Recirculation (EGR) scrubber and a scrubber water circulation tank. The method comprises circulating scrubber water in an EGC scrubber process loop between the scrubber water circulation tank and the EGC scrubber and in an EGR scrubber process loop between the scrubber water circulation tank and the EGR scrubber. The method further comprises removing particulate matter in the EGR scrubber process loop by feeding the scrubber water through a first separator unit and supplying a first alkaline agent to the scrubber water in the EGR scrubber process loop. The method offers the same advantages as the previously described combined cleaning system, whereby reference is made to the previous discussion to avoid undue repetition.

The method may further comprise providing the first separator unit in a position between the outlet of the scrubber water circulation tank and the inlet of the EGR scrubber.

The method may further comprise the step of supplying a second alkaline agent to the scrubber water in the EGC scrubber process loop in a position between the outlet of the scrubber water circulation tank and the inlet of the EGC scrubber, and/or the first alkaline agent to the scrubber water in the EGR scrubber process loop in a position between the outlet of the scrubber water circulation tank and the inlet of the EGR scrubber.

The method may further comprise the step of bleeding-off excess scrubber water from the scrubber water circulation tank into a bleed-off process loop, the bleeding-off being made from the EGC scrubber process loop.

According to the method, the bleed-off process loop may comprise the step of removing particulate matter from the bled-off scrubber water before discharging the thus cleaned scrubber water over-board.

According to the method, the bleed-off process loop may further comprise the steps of removing particulate matter from the bled-off scrubber water, controlling and approving the quality of the thus cleaned scrubber water, collecting the approved cleaned scrubber water and circulating it back into the EGC scrubber process loop for the purpose of cleaning and/or flushing the EGC scrubber.

According to yet another aspect, the invention relates to the use of the combined cleaning system according to any of claims 1-10 onboard a ship for the purpose of reduction of $SO_X$ and $NO_X$ in exhaust gases from a combustion engine.

Further objects and features will be apparent from the detailed description and the claims.

DRAWINGS

One embodiment of the invention will now be described, by way of example, in more detail with reference to the appended drawings in which.

DETAILED DESCRIPTION

Before going into details of the invention, the general principle of an EGC scrubber process and an EGR scrubber process will be described.

A typical EGC scrubber to be used on-board a ship is a so called wet scrubber. A wet EGC scrubber process as such is well known in the art and the general idea is to remove particulate matter such as soot, oil and heavy metals in the exhaust gas from an engine, such as a diesel engine on-board a ship, and at the same time wash out acid gases such as $SO_X$ from the exhaust gas by a flow of water. $SO_X$ is formed during the combustion process when sulphur in the fuel combines with oxygen. The basic principle when using water to dissolve $SO_X$ in the scrubbing process is that the $SO_X$ is oxidized to sulphates when reacting with alkaline water used in the EGC scrubber. In ports and rivers the alkalinity varies and is not always sufficient enough to facilitate the chemical reaction in case the scrubber process is run in a freshwater mode. It is therefore required to keep the alkalinity of the water. This may be made by adding an alkaline agent, such as a NaOH to the water.

Figure 1:
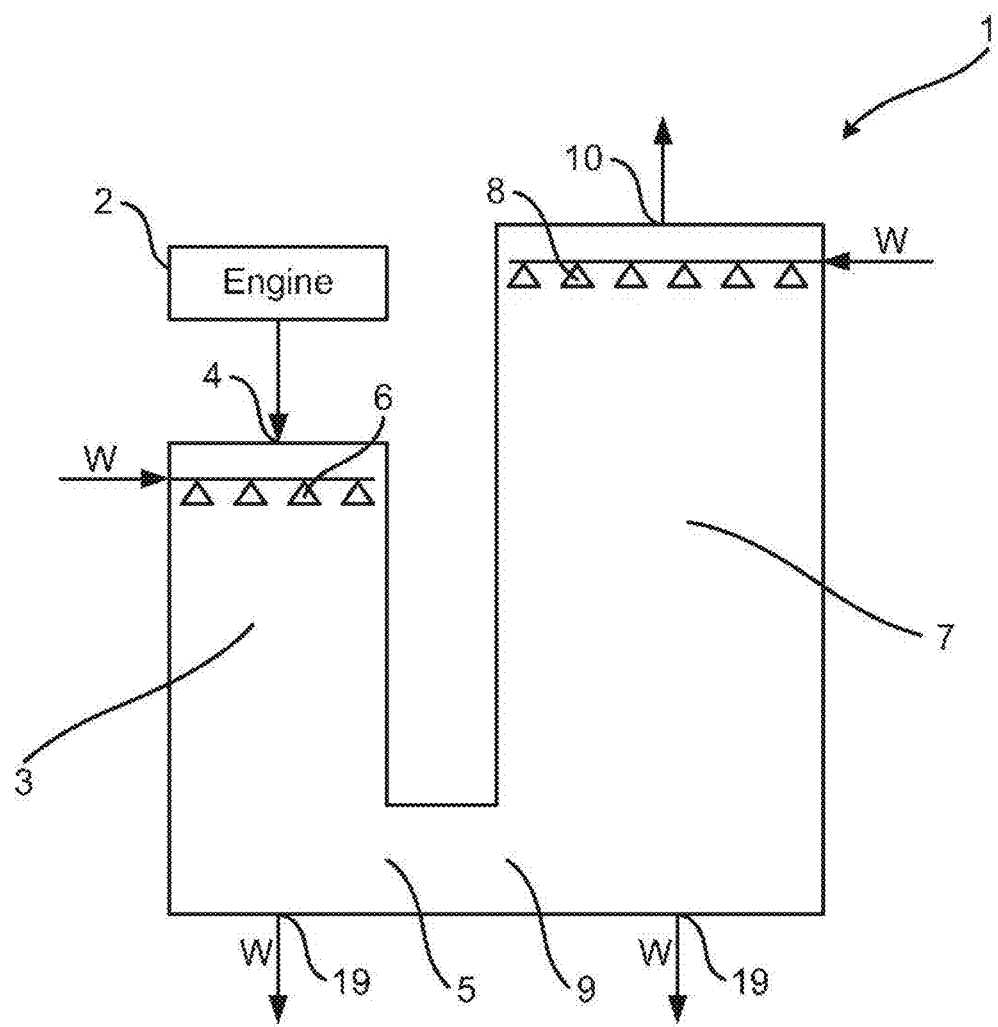
FIG. 1 is a schematic overview disclosing the general operation of an EGC wet scrubber.

A typical example of an EGC scrubber 1 of the wet scrubber type is disclosed in FIG. 1, to which reference now is made. The exhaust gas from a combustion engine 2 is passed through a first chamber 3, via an inlet 4 thereof to an outlet 5 thereof, while being flushed with a large flow of water W to quickly reduce the temperature from about 180-250° C. to about 45-55° C. The flushing may be made by a plurality of nozzles 6. By cooling the exhaust gas, the volume thereof may be reduced, allowing a second chamber 7, an absorption chamber, of the EGC scrubber 1 to be smaller dimensioned. Thereby the required space on-board the ship may be reduced which is advantageous not at least in case of retro-fitting an EGC scrubber 1. In the second chamber 7, the pre-washed exhaust gas is subjected to a counter flow of water W from nozzles 8 while being guided from an inlet 9 thereof, normally a bottom inlet communicating with the outlet 5 of the first chamber 3, to an outlet 10 thereof, normally a top outlet. During the passage through the second chamber 7, the exhaust gas may react with an alkaline agent supplied (not disclosed) to the water W prior to the EGC scrubber 1. During the reaction with the alkaline agent, the $SO_X$ contained in the exhaust gas may be dissolved in the water by the $SO_X$ oxidizing to sulphates. Particulate matter contained in the exhaust gas may be washed out together with the water via bottom outlets 19 arranged in the first and second chambers 3, 7.

To further improve the removal efficiency of the EGC scrubber 1, the residence time of the exhaust gas in the second chamber 7 may be increased. Alternatively, the available surface area inside the second chamber 7 may be increased by causing a larger contact surface with the exhaust gas. Well known techniques for this purpose is the use of spray nozzles, packed towers or an aspirator (not disclosed).

The thus cleaned exhaust gas may be emitted into the ambient air via the outlet 10 after a quality control (not disclosed) ensuring that it meets the legislated emission levels.

An EGC scrubber 1 may in general use seawater or freshwater, or even a mixture thereof.

In the following the general principle of an EGR scrubber process will be discussed with reference to FIG. 2. EGR scrubber processes as such are well known in the art and the general idea is to reduce the amount of nitrogen oxide ($NO_X$) in the exhaust gas to be emitted from an engine, such as a diesel engine on-board a ship.

The EGR scrubber 11 as such is a so called wet scrubber based on the same principle as the EGC scrubber, whereby reference is made to the above description to avoid undue repetition.

As a major difference to the EGC scrubber, a portion of the cleaned exhaust gas is re-circulated back into the combustion chamber of the combustion engine 2 for the purpose of reducing the level of $NO_X$. Approximately up to 40% of the exhaust gas may be recirculated back into the engine 2. The recirculated exhaust gas replaces some of the excess oxygen in the resulting pre-combustion mixture. The thus lowered oxygen level increases the level of carbon dioxide ($CO_2$). $NO_X$ is primarily formed when a mixture of nitrogen and oxygen is subjected to a high temperature. However, the increased level of $CO_2$ has the effect that the combustion temperature is reduced. Consequently the level of $NO_X$ formed in the exhaust gas may be reduced.

Like the EGC scrubber 1, the EGR scrubber 11 may in general use seawater or freshwater, or even a combination thereof.

Figure 3:
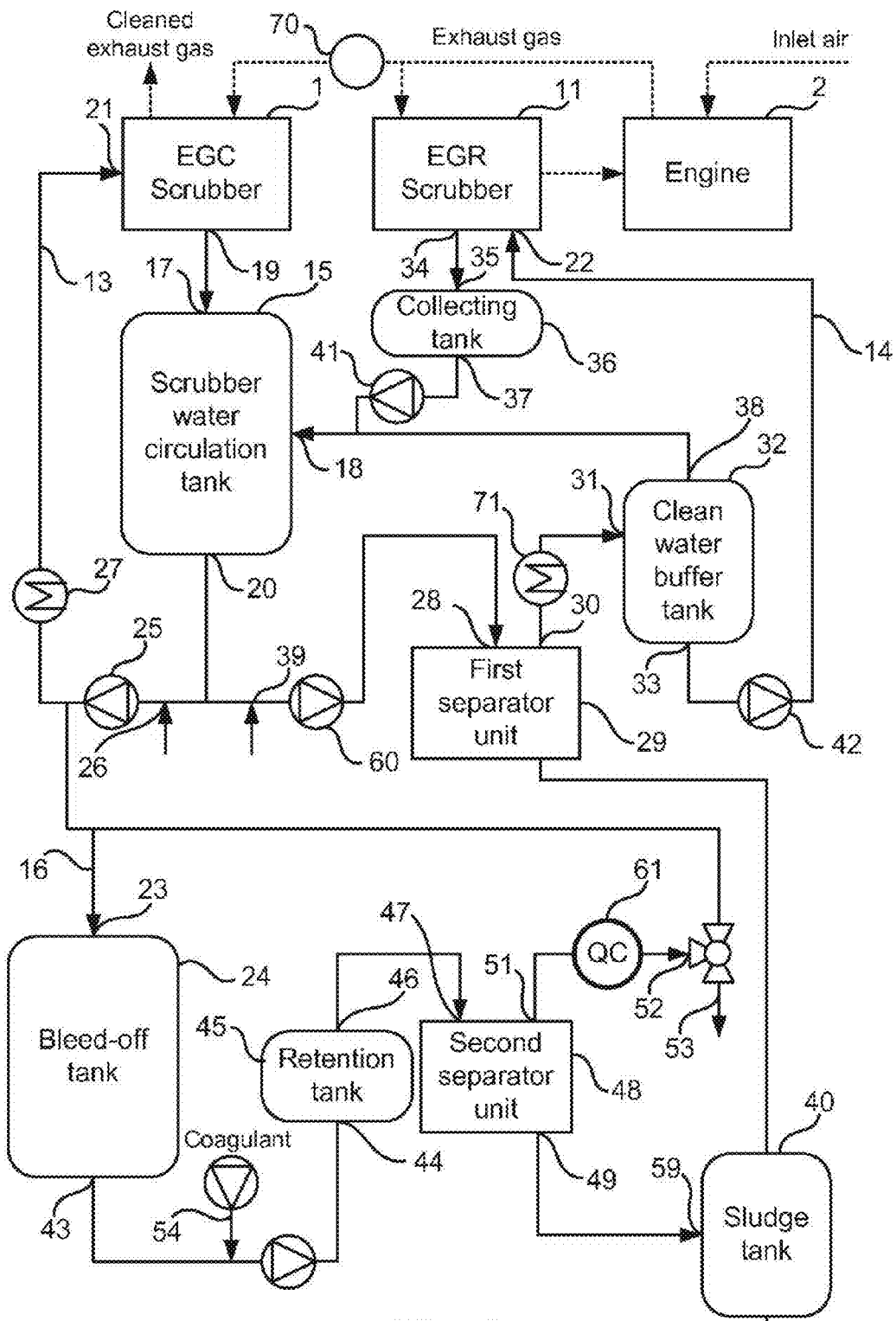
FIG. 3 is a schematic overview of the inventive system.

Now referring to FIG. 3 a schematic overview of the inventive system is disclosed. The inventive system comprises two loops, an EGC scrubber process loop 13 and an EGR scrubber process loop 14, for circulation of water from a common scrubber water circulation tank 15. The inventive system also allows the scrubber water circulation tank 15 to form part of a third process loop, in the following identified as a bleed-off loop 16.

More precisely, the inventive system comprises the scrubber water circulation tank 15 having a first 17 and a second inlet 18. The first inlet 17 is arranged in communication with an outlet 19 of an EGC scrubber 1 forming part of the EGC scrubber process loop 13 and the second inlet 18 is arranged in communication with an outlet 34 of an EGR scrubber 11 forming part of the EGR scrubber process loop 14. Further, the scrubber water circulation tank 15 has an outlet 20 arranged in communication with an inlet 21 of the EGC scrubber 1 and with an inlet 22 of the EGR scrubber 11. The inlets 21 and 22 of the EGC scrubber 1 and the EGR scrubber 11 correspond to the inlet 4 of the first chamber of an EGC/EGR wet scrubber 1, 11 as seen in FIGS. 1 and 2.

Although, the following description is based on the EGC scrubber 1 and the EGR scrubber 11 being arranged in communication with one and the same outlet 20 of the scrubber water circulation tank 15, it is to be understood that the scrubber water circulation tank 15 may be provided with two separate outlets arranged in communication with the EGC scrubber 1 and the EGR scrubber 11, respectively.

The outlet 20 of the scrubber water circulation tank 15 is further arranged in communication with an inlet 23 of a bleed-off tank 24 forming part of the bleed-off loop 16.

The inventive system and the individual components contained therein will be discussed in detail below.

Starting with the EGC scrubber process loop 13, the scrubber water circulation tank 15 is via its outlet 20 connected to the inlet 21 of the EGC scrubber 1, whereby the EGC scrubber 1 may be supplied with a large flow of water from the scrubber water circulation tank 15. For better understanding and as a non-limiting example, the amount may be approximately 30 m$^3$/MWh in case of fresh water applications. The water is pumped by a pump 25 into the EGC scrubber 1.

Prior to the EGC scrubber 1, the pH of the water from the scrubber water circulation tank 15 may be increased by an arrangement 26 for supply of a second alkaline agent such as NaOH or equivalent. Although the supply of the second alkaline agent is disclosed as taking place before the pump 25 arranged to pump the water into the EGC scrubber 1, it is to be understood that the second alkaline agent may be supplied at any position between the outlet 20 of the scrubber water circulation tank 15 and the inlet 21 of the EGC scrubber 1. The supply of second alkaline agent may be controlled by a controller (not disclosed). The water supplied to the inlet of the EGC scrubber may be passed via a cooler 27 for the purpose of maintaining as low temperature as possible in the scrubber section. The cooling promotes an efficient condensation to thereby avoid losing water by evaporation.

In the EGC scrubber 1, see FIGS. 1 and 3, the water meets the flow of exhaust gas from the combustion engine 2. The EGC scrubber 1 is arranged on a low pressure side of a turbo charger 70. The exhaust gas from the combustion engine 2 is passed through the first chamber 3 of the EGC scrubber 1 while being flushed with water to quickly reduce the temperature from about 180-250° C. to about 45-55° C. Also, a portion of particulate matter contained in the exhaust gas may be washed out. The thus pre-washed and cooled gas is fed into the second chamber 7 of the EGC scrubber 1, being the absorption chamber, where it is subjected to a counter flow of water while being guided from the inlet 9 thereof to the outlet 10 thereof. During the passage through the second chamber 7, the exhaust gas reacts with the alkaline agent in the water, whereby the SO$_X$ contained in the exhaust gas is dissolved in the water by the SO$_X$ oxidizing to sulphates. Further, any remaining particulate matter may be washed out together with the water.

The water used in the EGC scrubber 1 is returned, see FIG. 3, together with washed-out particulate matter, to the first inlet 17 of the scrubber water circulation tank 15 via the outlet 19 of the EGC scrubber 1. The cleaned exhaust gas may be emitted into the ambient air via the outlet 10. The two outlets 19 of FIG. 1 are in FIG. 3 illustrated as one outlet 19.

The other portion of the exhaust gas from the combustion engine 2 not subjected to the EGC scrubber process loop 13 will instead be subjected to the EGR scrubber process loop 14. The EGR scrubber process loop 14 is arranged to take place on a high pressure side of the turbo charger 70.

In the disclosed EGR scrubber process loop 14, the scrubber water circulation tank 15 is via its outlet 20 connected to an inlet 28 of a first separator unit 29. An outlet 30 of the first separator unit 29 is connected to an inlet 31 of an optional clean water buffer tank 32. A first outlet 33 of the clean water buffer tank 32 is connected to the inlet 22 of the EGR scrubber 11. Further, an outlet 34, corresponding to outlet 19 of FIG. 2, of the EGR scrubber 11 is connected to an inlet 35 of an optional collecting tank 36 and an outlet 37 of the collecting tank 36 is connected to the second inlet 18 of the scrubber water circulation tank 15. In the disclosed EGR scrubber process loop 14, a heat exchanger 71 is arranged between the outlet 30 of the first separator unit 29 and the inlet 31 of the optional clean water buffer tank 32.

A second outlet 38 of the clean water buffer tank 32 is connected to the second inlet 18 of the scrubber water circulation tank 15.

Prior to the EGR scrubber 11, the pH of the water from the scrubber water circulation tank 15 may be increased by an arrangement 39 for supply of a first alkaline agent such as NaOH or equivalent. Although the supply of the first alkaline agent is disclosed as taking place before the first separator unit 29, it is to be understood that the first alkaline agent may be supplied at any position between the outlet 20 of the scrubber water circulation tank 15 and the inlet 22 of the EGR scrubber 11. Generally an EGR process operates at a higher pH as compared to an EGC process, whereby the required amount of alkaline agent to supply might be higher than that to the EGC scrubber. The supply of alkaline agent may be controlled by a controller (not disclosed).

During operation of the EGR scrubber process loop 14, water from the scrubber water circulation tank 15 is supplied to the first separator unit 29, minimizing the amount of particulate matter being transferred to the EGR scrubber 11. The first separator unit 29 may be a high speed separator. The particulate matter collected by the first separator unit 29 may be discharged directly from the first separator unit 29 or pumped into and collected in a sludge tank 40 to be discussed below. Since the first separator unit 29 is fed with water from the scrubber water circulation tank 15, the first separator unit 29 separates the particulate matter washed out from both the EGC scrubber process loop 13 and the EGR scrubber process loop 14. However, since the EGR scrubber 11 works with a recirculation of exhaust gas into the combustion engine 2 and since the combustion engine 2 as such is typically sensitive to particulate matter, it is advantageous to arrange the first separator unit 29 in the EGR scrubber process loop 14 downstream the EGR scrubber 11 rather than in the EGC scrubber process loop 13.

The water cleaned by the first separator unit 29 is transferred into the clean water buffer tank 32. Water in an amount required to operate the EGR scrubber 11 is fed from the clean water buffer tank 32 to the EGR scrubber 11. The amount required depends on the engine load of the combustion engine 2 generating the exhaust gas to be cleaned by the EGR scrubber 11. The amount of water pumped into the EGR scrubber 11 may by way of example be at a rate of approximately 2-3 m$^3$/MWh.

The excess water in the clean water buffer tank 32, i.e. the water not required in the EGR scrubber 11, is returned into the scrubber water circulation tank 15. Due to the first separator unit 29, the water returned to the scrubber water circulation tank 29 has a reduced level of particulate matter.

Figure 2:
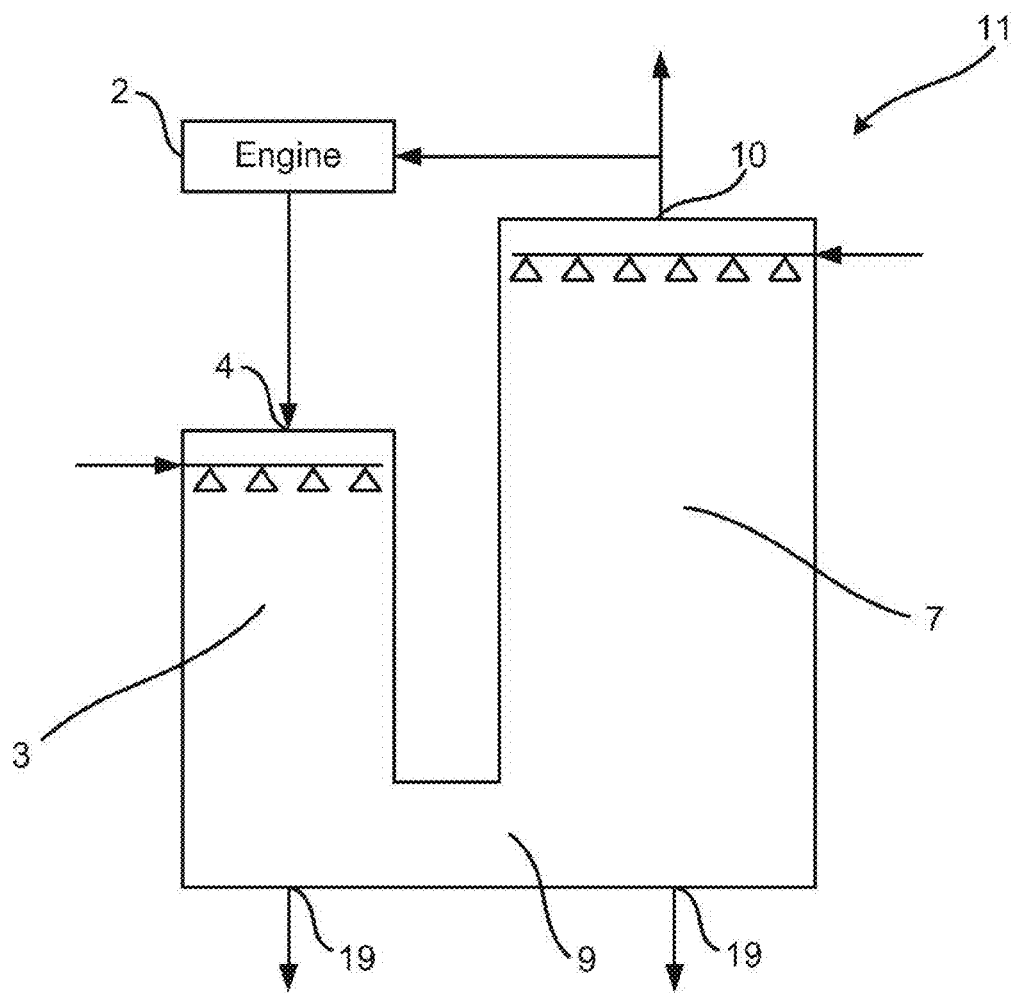
FIG. 2 is a schematic overview disclosing the general operation of an EGR wet scrubber.

In the EGR scrubber 11, see FIG. 2, the water from the clean buffer tank 32 meets the flow of exhaust gas from the combustion engine 2. The exhaust gas from the combustion engine 2 is passed through the first chamber 3 of the EGR scrubber 11 while being flushed with a water flow to quickly reduce the temperature from about 180-250° C. to a temperature corresponding to the seawater temperature plus about 10-20° C. This should be regarded as a rough, non-limiting example only. The thus cooled gas is fed into the second chamber 7 of the EGR scrubber 11, being the absorption chamber, where the pre-washed and cooled exhaust gas is subjected to a counter flow of water while being guided from the inlet 9 to the outlet 10. During the passage through the second chamber 7, the exhaust gas reacts with the alkaline agent in the water whereby the SO$_X$ contained in the exhaust gas may be dissolved in the water by the SO$_X$ oxidizing to sulphates. Further, particulate matter contained therein may be washed out together with the water.

As a non-binding example, typically 40% of the exhaust gas may be cleaned by the EGR scrubber 11, while the rest 60% of the exhaust gas is fed to the EGC scrubber. It is to be understood that the EGR scrubber 11 is to be regarded as a closed circuit emitting no gas into the ambient air.

The water used in the EGR scrubber 11 is returned to the scrubber water circulation tank 15 via its second inlet 18. This may be made directly or via the optional collecting tank 36. The collecting tank 36 may be useful if the distance between the EGR scrubber 11 and the scrubber water circulation tank 15 is large. It is further possible to arrange an optional pump 41 between the outlet 37 of the collecting tank 36 and the second inlet 18 of the scrubber water circulation tank 15.

The clean water buffer tank 32 may be pressurized. The pressurization may be achieved by the first separator unit 29, such as by paring discs included therein in case of a high speed separator unit. The pressurization allows for a continuous water supply to the EGR process loop 14 even when the first separator unit 29 is shifted from a normal operation mode being a separation mode to a discharge mode in which separated particulate matter is discharged to the sludge tank 40. During such shifting, a pressure drop results which might affect the water supply to the EGR scrubber 11. However, by using the pressurized clean water buffer tank 32, such pressure drop may be compensated for.

It is to be understood that a continuous water supply to the EGR scrubber 11 from the clean water buffer tank 32 may be arranged by a pump 42 being arranged between the outlet 33 of the clean water buffer tank 32 and the inlet 22 of the EGR scrubber 11.

It is also to be understood that the clean water buffer tank 32 may be omitted. This may be made possible in case the first separator unit 29 is a so called partial discharge high speed separator with a hermetic inlet and outlet. In that case a pump 60 feeding water to the first separator unit 29 may be used both for pumping water directly to the EGR scrubber 11 and excess water back to the scrubber water circulation tank 15. The division of the flow of water from the first separator unit 29 to the EGR scrubber 11 and the scrubber water circulation tank 15 may be controlled by a valve (not disclosed).

In one embodiment the first separator unit 29 may be a so called total discharge high speed separator with a hermetic inlet and outlet. In that case the pump 60 feeding water to the first separator unit 29 may be used for pumping excess water back into the scrubber water circulation tank 15. In such embodiment the pressurized clean water buffer tank 32 is used to maintain the flow of water to the EGR scrubber 11 even when the first separator unit 29 is shifted from a normal operation mode being the separation mode to the discharge mode for the purpose of discharging separated waste material to the sludge tank 40.

It will be understood that no matter if it is the EGC scrubber process loop 13 or the EGR scrubber process loop 14, any water contained in the exhaust gas will condense when colder water from the scrubber water circulation tank 15 meets hot exhaust gas from the combustion engine 2. The amount of water in the cleaning system will consequently gradually increase. It is also possible to add freshwater to the cleaning system in order to dilute the salt content thereof, which otherwise gradually will increase. To keep the amount and the salt concentration of the recirculating water under control, excess water may be drained into the bleed-off loop 16 to be discussed below.

In the disclosed embodiment, the draining into the bleed-off loop 16 is illustrated as taking place in the EGC scrubber process loop 13 between the pump 25 and the inlet 21 of the EGC scrubber 1. It is to be understood that the draining should not be limited to this position. Draining may also be made from the EGR scrubber process loop 14.

The bleed-off loop 16 comprises the bleed-off tank 24. An outlet 43 of the bleed-off tank 24 is connected to an inlet 44 of an optional retention tank 45. An outlet 46 of the retention tank 45 is connected to an inlet 47 of a second separator unit 48. In case the retention tank 45 is omitted, the outlet 43 of the bleed-off tank 24 is connected to the inlet 47 of the second separator unit 48. A first outlet 49 of the second separator unit 48 is connected to an inlet 59 of the sludge tank 40. A second outlet 51 of the second separator unit 48 is connected to a valve arrangement 52 which in turn is connected to the inlet 23 of the bleed-off tank 24 or to an overboard discharge pipe 53. Thus a bleed-off loop 16 is provided for the purpose of treating the bleed-off scrubber water to a water quality meeting legislated overboard discharge criteria's.

In the one embodiment in which the retention tank 45 is omitted, the water received in the bleed-off tank 24 is pumped into the second separator unit 48 where particulate matter is separated and collected in the sludge tank 40.

The cleaned and separated water is subjected to a quality control 61 to see whether the water meets the legislated overboard discharge criteria's or not. By way of example there are overboard discharge criteria's stating maximum levels of organic compounds, suspended solids also known as turbidity and pH level when bleeding-off the water into the sea.

If the quality is deemed acceptable, the water may be discharged overboard via the valve arrangement 52 and the overboard discharge pipe 53. If deemed not acceptable, or if discharge is not allowed due to a port stop or the ship being in a sensitive area, the water is returned into the bleed-off tank 24 via its inlet 23.

The bleed-off tank 24 further provides the possibility of re-circulation and further cleaning in case of very polluted water or if the use of coagulant is not wanted.

Although only one inlet 23 to the bleed-off tank 24 is disclosed, it is to be understood that the bleed-off tank 24 may be provided with one inlet communicating with the EGC scrubber process loop 13 or the EGR scrubber process loop 14 and one inlet communicating with the valve arrangement 52 of the bleed-off loop 16.

To further increase the performance of the second separator unit 48 of the bleed-off loop 16, even better cleaning or a possibility to have a higher throughput, a coagulant may be introduced into the water to be fed to the second separator unit 48 of the bleed-off loop 16 by means of an arrangement 54 for the supply of a coagulant. To enhance the performance of the coagulant, the above mentioned retention tank 45 may arranged in a position between the arrangement 54 for supply of coagulant and the second separator unit 48. The retention tank 45 allows the coagulant sufficient dwell time for precipitation/coagulation of particulate matter in the water before the water is fed to the second separator unit 48. The purpose of using a coagulant is to form chemical compounds where the particulate matters is connected to metal salts. Such chemical compounds are easier to separate by the second separator unit. The coagulant may by way of example be a trivalent metal ion such as Aluminium or Iron.

The discharge from the second separator unit 48 in the bleed-off loop 16 may be pumped into the same sludge tank 40 as used for the first separator unit 29 cooperating with the EGR scrubber process loop 14 or into a separate sludge tank (not disclosed). In the disclosed embodiment, one and the same sludge tank 40 is used to receive sludge from both separator units 29, 48. The content in the sludge tank 40 may be pumped ashore during a port stay or be further treated on-board.

One possibility when treating further on-board is to re-introduce (not disclosed) water collected from a top part of the sludge tank 40 back into the bleed-off tank 24. Another possibility is to feed contents of the sludge tank 40 through a so called dry separator unit (not disclosed) to thereby remove and thoroughly dry the solids in the sludge tank 40. Water not capillary bound is removed, minimising the total sludge amount. The thus removed water may be introduced back into the scrubber water circulation tank 15 or back to the bleed-off tank 24 for treatment to meet the legislated discharge criteria's.

The bleed-off loop 16 described above allows a reduction of freshwater consumption which is a constant struggle on the sea.

Figure 4:
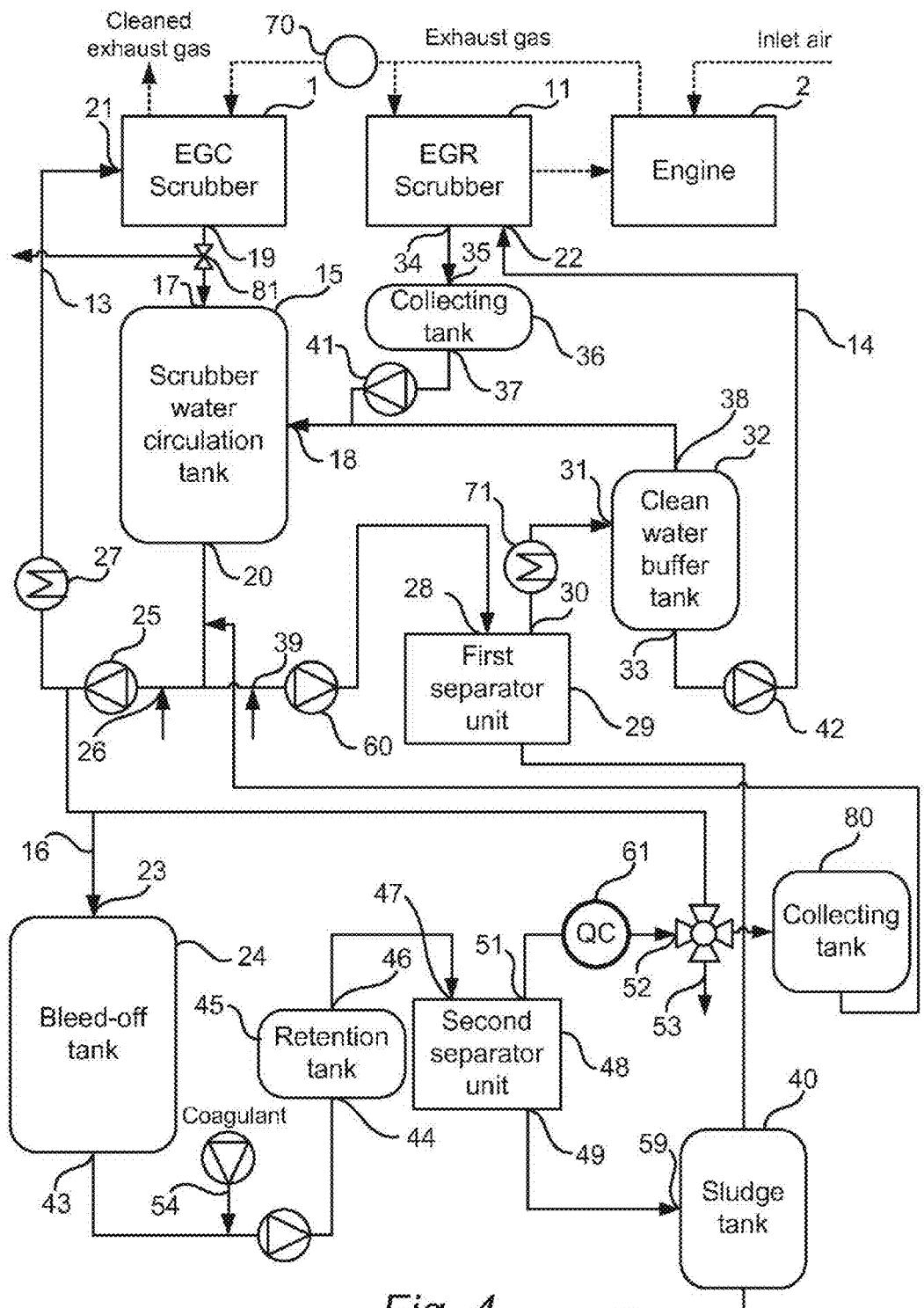
FIG. 4 is a schematic overview of a second embodiment of the inventive system.

Referring to FIG. 4 a second embodiment of the system is disclosed. The overall design of the system is identical with that discussed above with reference to FIG. 3 with the difference that a collecting tank 80 is arranged in the bleed-off loop 16 in a position downstream the quality control 61. In the disclosed embodiment the collecting tank 80 is connected to an outlet of the valve arrangement 52 and further connected to the ECR scrubber process loop 13 in a position between the outlet 20 of the scrubber water circulation tank 15 and the pump 25. Further, a valve 81 is arranged between the outlet 19 of the EGC scrubber 1 and the inlet 17 of the scrubber water circulation tank 15. The valve 81 may allow discharge 82 of such "used" quality controlled water into the sea or elsewhere, such as into a suitable non-disclosed tank. The water collected in the collecting tank 80 having a controlled quality may thus be used to clean or flush the EGC scrubber 1 upon a change from sea water mode to fresh water mode to thereby reduce corrosion related problems and also to avoid that sea water is introduced into the EGR scrubber 11. More precisely, if having a combined system, the fresh water and the sea water must share a number of components such as inlet piping, pumps, scrubbers and outlet piping. Accordingly, if simply changing from sea water mode to fresh water mode, a lot of sea water will end up in the common tank and hence into the EGR system. This requires that parts potentially subjected to sea water should be designed in material not prone to corrosion. This results in a substantial increased material cost. However, by cleaning/flushing the EGC scrubber 1 with quality controlled water, free of salt, it is avoided to get chlorides into the scrubber water circulation tank 15 and thus, the problems with corrosion mentioned above may be solved.

The description above has been based on an embodiment of an EGC and EGR scrubber 1, 11 comprising a first and a second chamber 3, 7 respectively, wherein the main purpose of the first chamber 3 is to rapidly cool down the exhaust gas. It is to be understood that the step of cooling down may be omitted and hence also the first chamber 3.

It is also to be understood that there are numerous EGC and EGR scrubbers 1, 11 available on the market and that the invention should not be limited to the design and the operation of the individual EGC and/or EGR scrubber. By way of example, it is possible to use multiple inlet scrubbers allowing a plurality of engines to be connected thereto.

Further, it is to be understood that there are numerous separator units available for the purpose of separating particulate matter from a liquid, whereby the invention should not be limited to the embodiments described. Examples of alternative separator units are filters, decanters and settling tanks, which may or may not be used in combination with flocculation or agglomeration agents.

Accordingly, it will be appreciated that numerous variants of the above described embodiments of the present invention are possible within the scope of the appended claims.

The invention claimed is:

1. Combined cleaning system to be used in a wet scrubber process for the reduction of $SO_X$ and $NO_X$ in exhaust gases from a combustion engine, the system comprising an Exhaust Gas Cleaning (EGC) scrubber and an Exhaust Gas Recirculation (EGR) scrubber, wherein the combined cleaning system further comprising a scrubber water circulation tank arranged to circulate scrubber water in an EGC scrubber process loop between the scrubber water circulation tank and the EGC scrubber and in an EGR scrubber process loop between the scrubber water circulation tank and the EGR scrubber, the EGR scrubber process loop comprising an arrangement for supply of a first alkaline agent to the flow of scrubber water and a first separator unit for the purpose of separating particulate matter from the circulated scrubber water.

2. Combined cleaning system according to claim 1, wherein the arrangement for supply of the first alkaline agent to the flow of scrubber water is positioned between an outlet of the scrubber water circulation tank and an inlet of the EGR scrubber.

3. Combined cleaning system according to claim 1, wherein the first separator unit is arranged in a position between the outlet of the scrubber water circulation tank and the inlet of the EGR scrubber.

4. Combined cleaning system according to claim 3, wherein the first separator unit is a high speed separator, a partial discharge high speed separator or a total discharge high speed separator.

5. Combined cleaning system according to claim 1, further comprising a clean water buffer tank arranged in a position between an outlet of the first separator unit and the inlet of the EGR scrubber.

6. Combined cleaning system according to claim 1, wherein the EGC scrubber process loop comprises an arrangement for supply of a second alkaline agent to the flow of scrubber water in a position between the outlet of the scrubber water circulation tank and an inlet of the EGC scrubber.

7. Combined cleaning system according to claim 1, further comprising a bleed-off process loop, the bleed-off process loop comprising a second separator unit and a sludge tank, and the bleed-off process loop being connected to the EGC scrubber process loop and/or to the EGR scrubber process loop.

8. Combined cleaning system according to claim 7, the bleed-off process loop further comprising an arrangement for the supply of a coagulant in a position after an outlet of the bleed-off tank and before an inlet of the second separator unit.

9. Combined cleaning system according to claim 8, further comprising a retention tank, the retention tank being arranged in a position between the arrangement for the supply of the coagulant and the inlet of the second separator unit.

10. Combined cleaning system according to claim 7, further comprising a collecting tank, the collecting tank being arranged to collect water separated by the second separator unit, whereby the collecting tank is connected to the EGC scrubber process loop in a position between the outlet of the scrubber water circulation tank and the inlet of the EGC scrubber.

11. Method for the reduction of $SO_X$ and $NO_X$ in exhaust gases from a combustion engine by using a combined wet scrubber cleaning system, the system comprising an Exhaust Gas Cleaning (EGC) scrubber, an Exhaust Gas Recirculation (EGR) scrubber and a scrubber water circulation tank, comprising circulating scrubber water in an EGC scrubber process loop between the scrubber water circulation tank and the EGC scrubber and in an EGR scrubber process loop between the scrubber water circulation tank and the EGR scrubber, removing particulate matter in the EGR scrubber process loop by feeding the scrubber water through a first separator unit and supplying a first alkaline agent to the scrubber water in the EGR scrubber process loop.

12. Method according to claim 11, comprising providing the first separator unit in a position between the outlet of the scrubber water circulation tank and the inlet of the EGR scrubber.

13. Method according to claim 11, comprising supplying a second alkaline agent to the scrubber water in the EGC scrubber process loop in a position between the outlet of the scrubber water circulation tank and the inlet of the EGC scrubber, and/or the first alkaline agent to the scrubber water in the EGR scrubber process loop in a position between the outlet of the scrubber water circulation tank and the inlet of the EGR scrubber.

14. Method according to claim 11, further comprising bleeding-off excess scrubber water from the scrubber water circulation tank into a bleed-off process loop, the bleeding-off being made from the EGC scrubber process loop.

15. Method according to claim 14, wherein the bleed-off process loop comprises the step of removing particulate matter from the bled-off scrubber water before discharging the thus cleaned scrubber water over-board.

16. Method according to claim 14, wherein the bleed-off process loop comprises the steps of removing particulate matter from the bled-off scrubber water, controlling and approving the quality of the thus cleaned scrubber water, collecting the approved cleaned scrubber water and circulating it back into the EGC scrubber process loop for the purpose of cleaning and/or flushing the EGC scrubber.

17. Use of the combined cleaning system according to claim 1 on-board a ship for the purpose of reduction of $SO_X$ and $NO_X$ in exhaust gases from a combustion engine.

* * * * *